(12) United States Patent
Khal

(10) Patent No.: US 12,006,103 B2
(45) Date of Patent: Jun. 11, 2024

(54) SPILL PREVENTING CONTAINER LID

(71) Applicant: Zaki Khal, Las Vegas, NV (US)

(72) Inventor: Zaki Khal, Las Vegas, NV (US)

( * ) Notice: Subject to any disclaimer, the term of this patent is extended or adjusted under 35 U.S.C. 154(b) by 0 days.

(21) Appl. No.: 17/565,935

(22) Filed: Dec. 30, 2021

(65) Prior Publication Data
US 2022/0371788 A1    Nov. 24, 2022

Related U.S. Application Data

(63) Continuation of application No. 17/556,300, filed on Dec. 20, 2021.

(60) Provisional application No. 63/218,301, filed on Jul. 3, 2021, provisional application No. 63/192,022, filed on May 23, 2021.

(51) Int. Cl.
*B65D 43/02* (2006.01)
*B29D 99/00* (2010.01)

(52) U.S. Cl.
CPC ..... *B65D 43/0212* (2013.01); *B29D 99/0096* (2013.01); *B65D 2543/00027* (2013.01); *B65D 2543/00046* (2013.01); *B65D 2543/00092* (2013.01); *B65D 2543/00527* (2013.01); *B65D 2543/00537* (2013.01); *B65D 2543/00629* (2013.01); *B65D 2543/00638* (2013.01); *B65D 2543/00685* (2013.01); *B65D 2543/00759* (2013.01); *B65D 2543/00796* (2013.01)

(58) Field of Classification Search
CPC .......... B65D 47/40; B65D 2543/00046; B65D 43/0212
See application file for complete search history.

(56) References Cited

U.S. PATENT DOCUMENTS

| | | |
|---|---|---|
| 4,756,440 A | 7/1988 | Gartner |
| D417,845 S | 12/1999 | Sadlier |
| 6,314,866 B1 | 11/2001 | Melton |
| 6,991,128 B1 | 1/2006 | Russo et al. |
| D543,777 S | 6/2007 | Seum |
| D544,749 S | 6/2007 | Seum |

(Continued)

FOREIGN PATENT DOCUMENTS

JP    2012001265    1/2012

OTHER PUBLICATIONS

Huhtamaki, 10S-24 Oz. Black Reclose Lid, https://www.huhtamaki.com/en-us/north-america/foodservice/product-catalog/cups-lids/single-wall-hot-cup-lids/10s-24-oz.-black-reclose-lid/, accessed Mar. 17, 2022, 1 page.

(Continued)

*Primary Examiner* — Jeffrey R Allen
(74) *Attorney, Agent, or Firm* — Weide & Miller, Ltd.

(57) ABSTRACT

A spill-preventing lid for a container comprises a lid body having a top, a bottom, a peripheral flange and a drink opening through the body from the bottom to the top, and a spill-preventing baffle, the baffle comprising a wall extending downwardly from the bottom of the lid body, the baffle having a top and a bottom, the top of the baffle communicating with the drink opening, at least one opening in the bottom, and a passage leading from the at least one opening in the bottom to the top, allowing liquid to flow from the container into the baffle, though the passaged defined by the baffle and to the drink opening, the at least one opening in the bottom being substantially smaller in dimension than the dimension of the drink opening.

20 Claims, 10 Drawing Sheets

(56) References Cited

U.S. PATENT DOCUMENTS

| | | | |
|---|---|---|---|
| D584,106 S | 1/2009 | Wong | |
| D591,151 S | 4/2009 | Freeman | |
| D592,056 S | 5/2009 | Tedford, Jr. | |
| D634,192 S | 3/2011 | Mueller | |
| D658,057 S | 4/2012 | Donat | |
| D675,524 S | 2/2013 | Bickert | |
| D696,940 S | 1/2014 | Hale | |
| 8,727,163 B2* | 5/2014 | Chrisman | A47G 19/2272 220/731 |
| D737,139 S | 8/2015 | Sokoly | |
| D753,999 S | 4/2016 | Crosby | |
| D829,549 S | 10/2018 | D'Amato | |
| 2005/0173443 A1* | 8/2005 | Crudgington | B65D 47/40 220/713 |
| 2008/0237247 A1 | 10/2008 | Mucci et al. | |
| 2009/0065518 A1 | 3/2009 | Carnevali | |
| 2010/0101060 A1 | 4/2010 | Ruse, Jr. | |
| 2012/0312827 A1* | 12/2012 | Zuares | B65D 55/16 220/713 |
| 2014/0057023 A1 | 2/2014 | Sabga et al. | |
| 2014/0203032 A1 | 7/2014 | Prescott et al. | |
| 2014/0299614 A1* | 10/2014 | Mithal | B65D 43/0212 220/713 |
| 2016/0325883 A1 | 11/2016 | Wu | |
| 2017/0127860 A1 | 5/2017 | Khalaf | |
| 2020/0253830 A1* | 8/2020 | Chen | A61J 11/0035 |

OTHER PUBLICATIONS

Juhtamaki, 10S-24 Oz. Black Dome Sipper Lid, https://www.huhtamaki.com/en-us/north-america/foodservice/product-catalog/cups-lids/single-wall-hot-cup-lids/10s-24-oz-black-dome-sipper-lid/, accessed Mar. 17, 2022, 1 page.

Search Report and Written Opinion for PCT Patent Application No. PCT/US2022/30085, mailed Aug. 17, 2022, 13 pages.

Amazon. Restaurantware Lids Only: Restpresso 3.6 Inch Coffee Cup Lids—Fits 8, 12, 16 & 20 Ounce Cups, Leakprproof, Tangerine Orange Plastic Hot Cup Lids, Elevated Drink Sprout. Feb. 21, 2022. https://www.amazon.com/LIDS-ONLY-Restpresso-Disposable-Restaurantware/dp/B09SZB3GVC?th=1 , Feb. 21, 2022, 10 pages.

Amazon. Eco-Products Eph116wr Ecolid 25% Recy Content Hot Cup, White, F/10-20Oz, 100/Pk, 10/Pk/Ct. Oct. 16, 2012. https://tinyurl.com/3ae68jud, 2012, 5 pages.

USPTO, Office Action for U.S. Appl. No. 17/556,300, mailed Jul. 21, 2023, 31 pages.

USPTO, Office Action for U.S. Appl. No. 17/556,300, mailed Jan. 17, 2024, 11 pages.

Leon Orb. Bamboo Coffee Lid—8 oz. No date specified. https://leanorb.com/products/coffee-cup-lid?variant=33118925389963, Printed 2023, 5 pages.

Core 77. How Lid Design Changes in 1967, '75, and '84 Led Us to Drink Coffee On-the-Go. Jan. 2, 2020. https://www.core77.com/posts/92200/How-Lid-Design-Changes-in-1967-75-and-84-Led-Us-to-Drink-Coffee-On-the-Go, Printed 2023, 8 pages.

BioPak. 90mm Large White PS BioCup Lid. No date specified. https://www.biopak.com/nz/8-20oz-90mm-dia-ps-white-large-lid, Printed 2023, 3 pages.

* cited by examiner

SPILL PREVENTING CONTAINER LID

RELATED APPLICATION DATA

The present application is a continuation of U.S. patent application Ser. No. 17/556,300 filed on Dec. 20, 2021, which claims priority to U.S. Provisional Application Ser. No. 63/192,022 filed May 23, 2021 and U.S. Provisional Application Ser. No. 63/218,301, filed Jul. 3, 2021. Each of said applications are incorporated by reference as if set forth fully herein.

FIELD OF THE INVENTION

The present invention relates to liquid containers.

BACKGROUND OF THE INVENTION

Various containers are known for containing liquids or fluids. Some of these containers are designed to allow a user to drink the liquid from the container. Such containers may comprise, for example, bottles, cans and cups.

One common drink container is a cup. Cups may have different shapes and sizes, but they generally share the feature of an open top. A problem with this configuration is that the liquid contained in the cup can easily spill out of the cup, such as if the cup is tipped over or if force is applied to the cup (such as if the cup bounces).

In order to maintain the liquid in a cup, a lid may be located at the top of the cup. However, in order to allow a user to still access the liquid in the cup without removing the lid (such as to drink the liquid or pour it from the cup), the lid must include one or more openings. These openings, however, also then present locations where the liquid may again undesirably escape from the cup.

For example, FIG. 1 is a cross-sectional view of a common disposable cup lid L for use with a disposable cup C. The cup lid L is configured to be connected to a top rim of the cup C and to generally close the top of the cup. However, the cup lid includes a drink opening O through which a user may drink liquid from the cup.

As shown in FIG. 1, a problem with this design is that if a force is applied to the cup, the fluid F in the cup will move within the cup C and can simply flow directly out of the drink opening O. Thus, fluid F may unintentionally flow through the lid L and out of the cup C (e.g. a "spill").

Many attempts have been made at addressing this problem.

First, the lid can be created with an opening which accepts a straw. This requires that the user have or be supplied with a straw. Further, many users do not like to drink through a straw, particularly when the drink is a hot drink.

Another common solution is to provide a removable stopper. The stopper may be located in the drink opening to block or close the opening. The problem is that the stopper has to be removed and replaced each time the user wishes to dispense liquid through the drink opening. In the case of a vendor providing the cup and lid, the vendor then also has to stock and supply stoppers to their customers, at increased cost. The user can also lose the stopper.

Other lids have been designed with an openable and closeable flap. The flap may comprise a portion of the lid which can be moved between open and closed positions. The flapper avoids the need for a separate stopper, but still suffers from the drawback that the user must open the flap in order to access the drink opening and to re-close the flap in order to close the drink opening thereafter.

Accordingly, a need exists to provide an improved liquid dispensing container, and particular, an improved disposable lid for a cup, such as a disposable cup, which lid is spill-preventing.

SUMMARY OF THE INVENTION

Aspects of the invention comprise spill-prevention technology. One aspect of the invention comprises a container having spill-prevention technology. In one embodiment, the container is a cup having a lid, where the spill-prevention technology is associated with the lid.

In various embodiments, the spill-preventing technology comprises at least one fluid energy dissipating and/or diverting element.

Other aspects of the invention comprises a method of producing a lid having spill-prevention technology of the invention.

In one embodiment, a spill-preventing lid for a container comprises a lid body having a top, a bottom, a peripheral flange and a drink opening through the body from the bottom to the top, and a spill-preventing baffle, the baffle comprising a wall extending downwardly from the bottom of the lid body, the baffle having a top and a bottom, the top of the baffle communicating with the drink opening, at least one opening in the bottom, and a passage leading from the at least one opening in the bottom to the top, allowing liquid to flow from the container into the baffle, through the passaged defined by the baffle and to the drink opening, the at least one opening in the bottom being substantially smaller in dimension than the dimension of the drink opening.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a container having spill-prevention technology. In one embodiment, the container is a cup having a lid, where the spill-prevention technology is associated with the lid. In one embodiment, the spill-preventing technology comprises at least one fluid energy dissipating and/or diverting element. The at least one fluid energy dissipating and/or diverting element may comprise at least one baffle, where the baffle is associated with, such as by being located adjacent to, a drink opening of the lid.

Container

Figure 1:
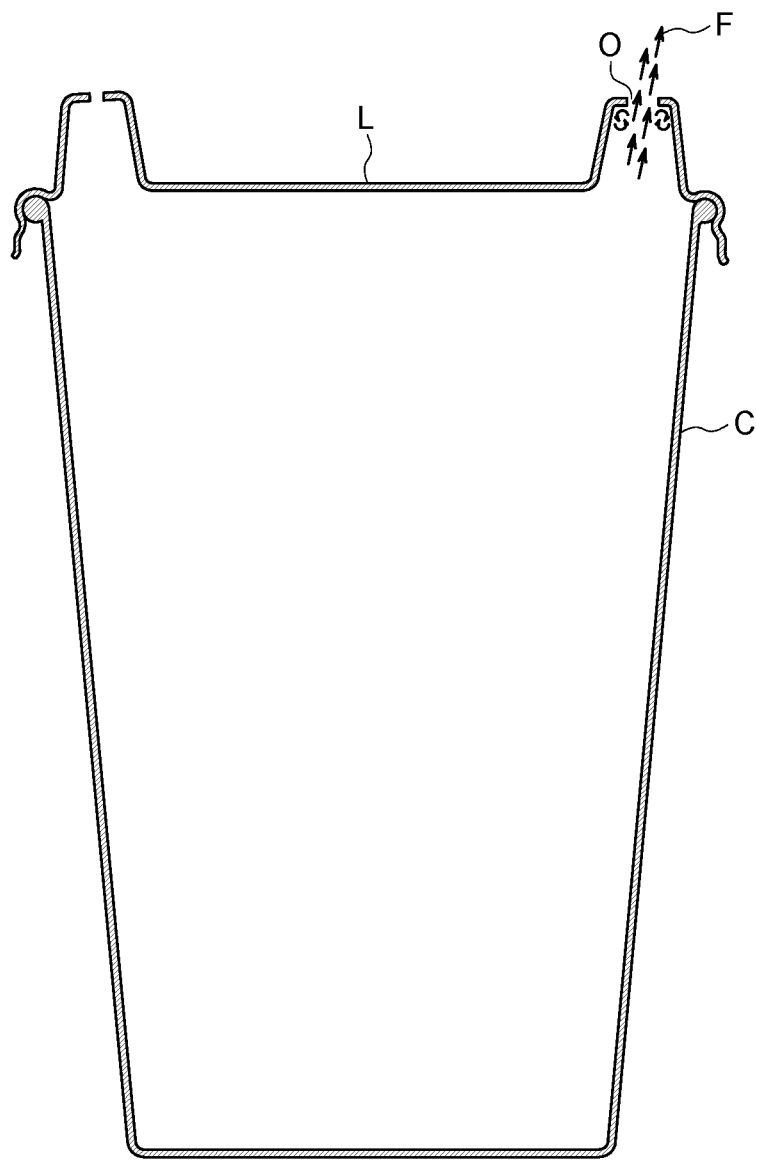
FIG. 1 is a cross-sectional view of a cup lid in accordance with an embodiment of the prior art.
Figure 2:
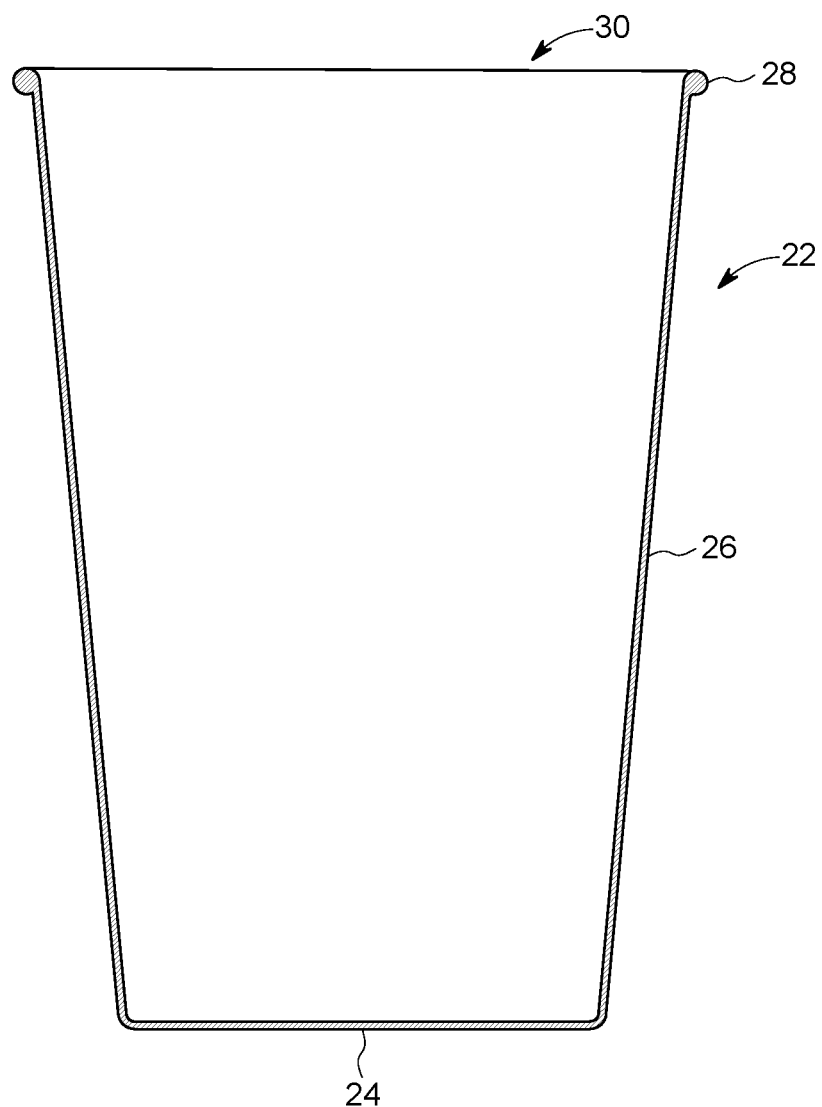
FIG. 2 is a cross-sectional view of a container, such as a cup, which may be provided with a lit having spill prevention technology in accordance with the present invention.

One embodiment of the invention will be described with reference first to FIG. 2. FIG. 2 illustrates a container 20. In one embodiment, the container 20 is configured as a cup 22, such as by having a body which is defined by a bottom 24 and an upwardly extending sidewall 26. The bottom 24 may be generally planar. The sidewall 26 preferably extends upwardly from the bottom 24 vertically or generally vertically (such as by having a negative draft moving away from the bottom 24).

In one embodiment, the cup 22 may be generally cylindrical in shape, having a generally circular cross-sectional shape, The bottom 24 may thus be generally circular and the sidewall 26 may be generally cylindrical.

In one embodiment, the top of the sidewall 26 comprises or defines a rim 28. The rim 28 might define a lip or otherwise comprise an area of increased cross-sectional area as compared to the remainder of the wall. For example, the rim 28 might define a lip or bead which is generally circular in cross-sectional shape. The rim 28 defines a generally open top 30 of the cup 22, the open top 30 being generally opposite the bottom 24.

In one embodiment, the container 20 may be disposable, such as constructed from paper stock, plastic, Styrofoam or the like. However, the container 20 could be constructed from other materials, such as plastic, metal (aluminum), glass, etc.

It is noted that while the container 20 preferably comprises a cup 22, the container could have other configurations. For example, the container 20 could be constructed as a generally cylindrical can, such as is common for the configuration of pop/soda containers.

In one embodiment, the container 20 has a top. The top could be integral to the body, or be connected thereto. For example, when the container 20 is configured as a can, the top of the container may be integral (such as by being physically and essentially permanently joined to the sidewall of the container during the manufacturing process).

In a preferred embodiment, the top comprises a removable lid 100. In a configuration where the container 20 is designed to be disposable, so may be the lid 100, such as by being constructed of plastic or a similar material.

One embodiment, of a lid 100 of the invention will be described with reference to FIG. 3. The lid 100 preferably comprise a body having a top 102, a generally opposing bottom 104, and a peripheral edge 106. In a preferred embodiment, the lid 100 may generally have a front 108, a rear 110 and a pair of opposing sides 112,114, in reference to a lid 100 having features as described below.

The lid 100 is preferably configured to engage the cup 22, such as the rim 28, and generally close the open top 30 thereof. In one embodiment, the lid 100 is selectively connectable to the cup 22, thus allowing the lid 100 to be connected to or removed from the cup 22.

In one embodiment, the lid 100 is configured to engage the rim 28 of the cup 22. In one embodiment, the peripheral edge 106 of the lid 100 defines a rim-accepting flange 116. This flange 116 is designed to extend over and capture the rim 28 of the cup 22. Preferably, the flange 116 can flex, thus allowing at least a portion thereof to move outwardly over the rim 28 and then bias or flex back inwardly to capture the rim 28, thus securing the lid 100 to the cup 22. In one embodiment, a bottom of the flange 106 may define a lower edge of the bottom 104 of the lid 100.

In one embodiment, the lid 100 may define or comprise a raised area 120. The raised area 120 preferably extends upwardly above one or more other portions of the lid 100, such as the peripheral edge 106. In one embodiment, at least a portion of the raised area 120 is located adjacent to the peripheral edge 106. As best illustrated in FIG. 3C, the raised area 120 need not have the same elevation in all areas. For example, a highest elevation of the raised area 120 may be located at the front 108 of the lid 100.

Figure 3A:
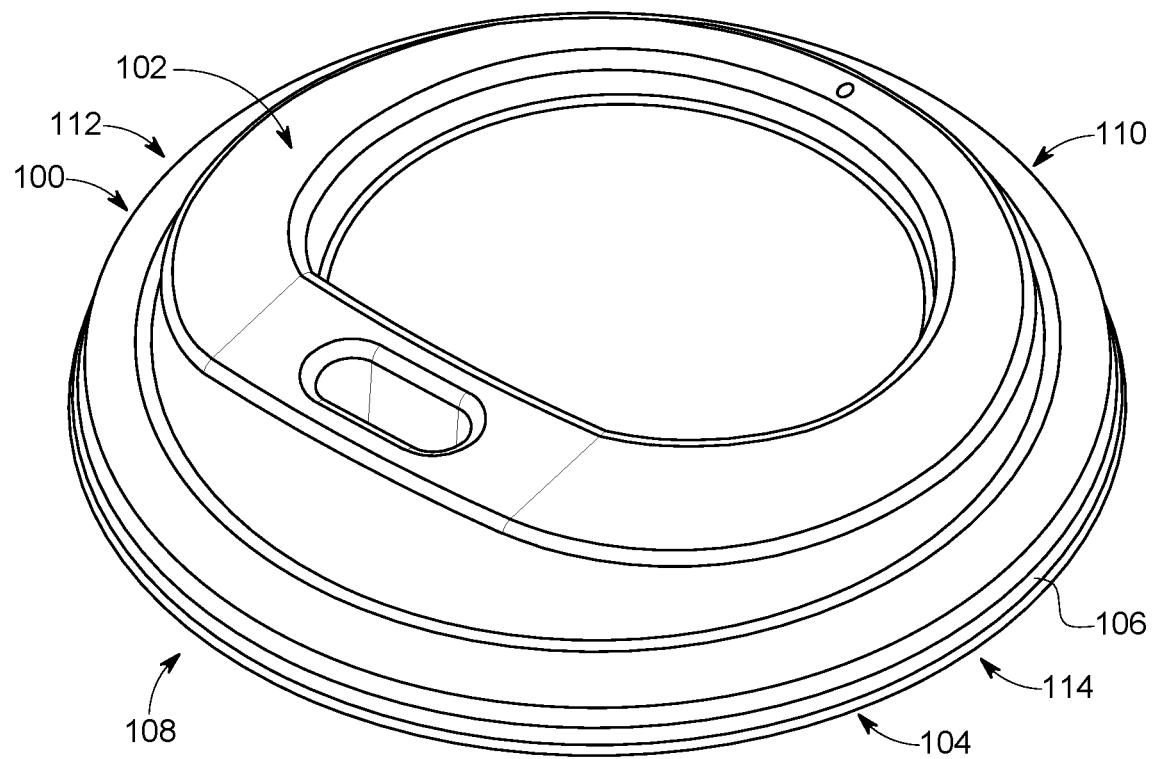
FIGS. 3A-F illustrate a container lid having spill prevention technology in accordance with an embodiment of the present invention.
Figure 3B:
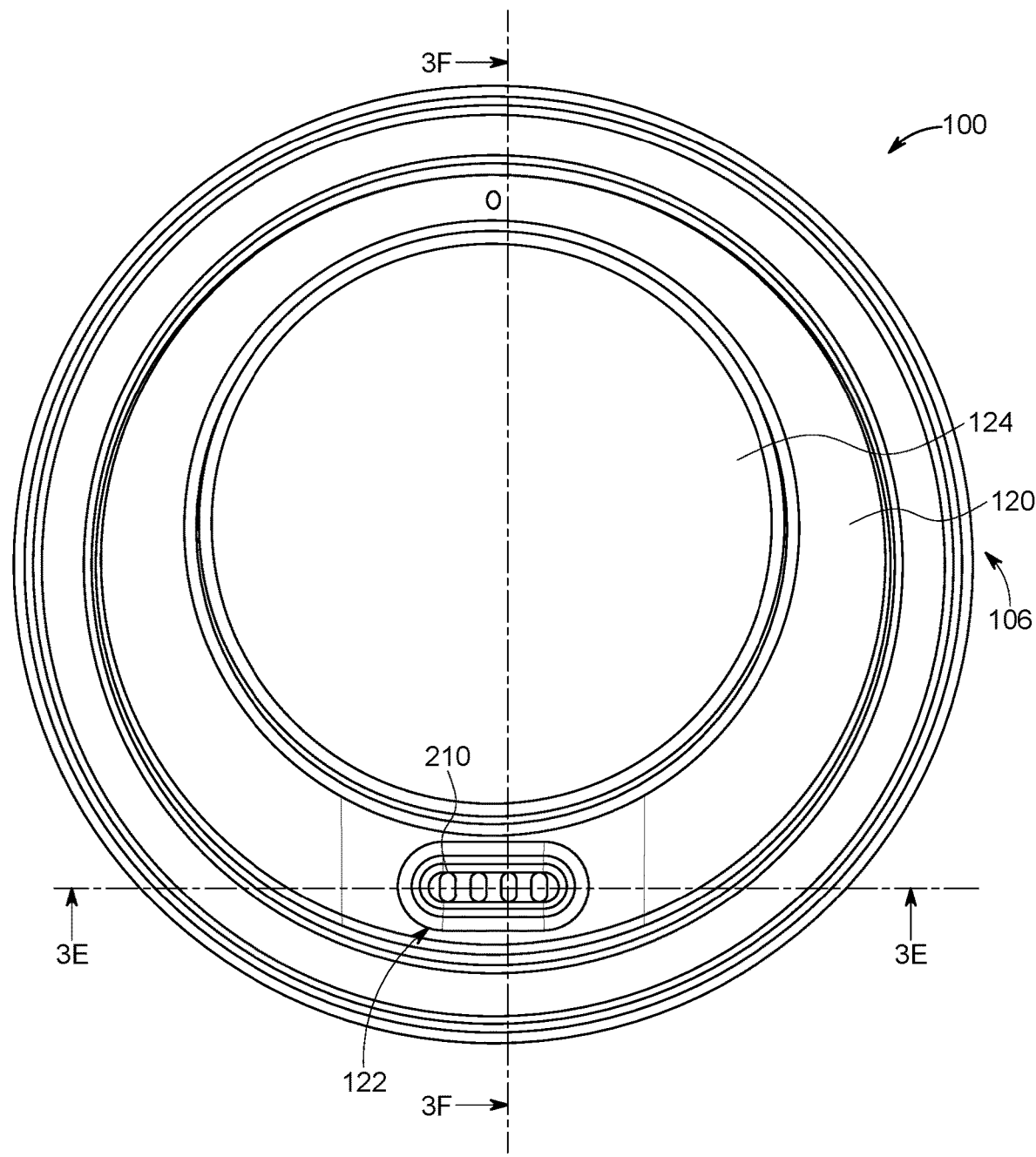
Figure 3C:
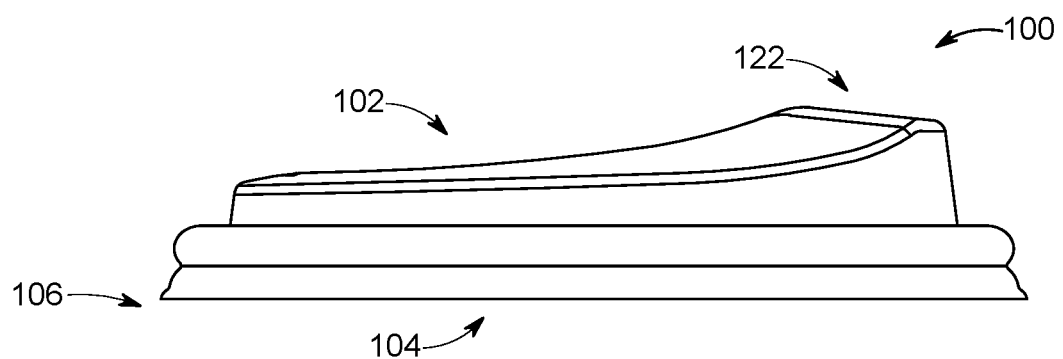
Figure 3D:
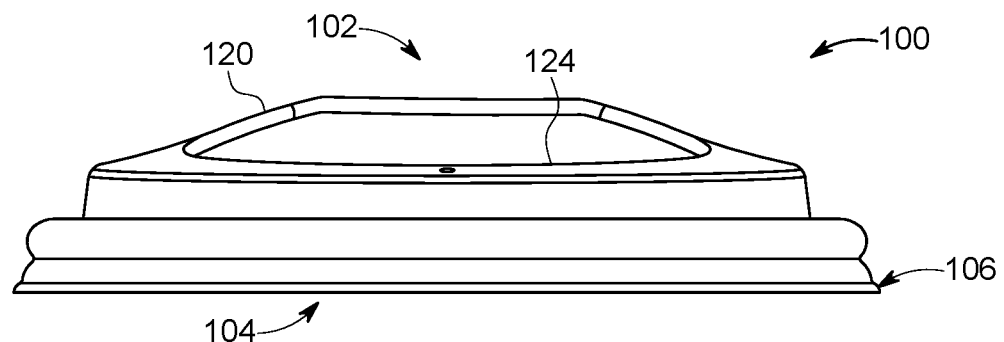

As illustrated in FIG. 3D, this design causes the lid 100 to have a central section 124 which is generally planar, a raised area 120 around the central section 124, and then a downwardly extending flange 116, which flange 116 extends below the central section 124.

The lid 100 preferably comprises at least one drink opening 122 (while one is preferred, the lid 100 could have more than one). In a preferred embodiment, the drink opening 122 is associated with the raised area 120, such as by being defined through a top of the raised area. As illustrated, the drink opening 122 may be located at the front 108 of the lid 100.

The shape of the drink opening 122 may vary. In one embodiment, the drink opening 122 is longer (in the side 112 to side 114) direction than it is wide (in the front 108 to back 110 direction). In one embodiment, the drink opening 122 may be generally oval in shape.

Spill Prevention Technology

Most importantly, the container 20 has spill prevention technology. Preferably this technology is associated with the top of the container 20. In the case of the container 20 which comprises a cup 22 having a lid 100, the spill prevention technology is associated with the lid 100. In one embodiment, the spill prevention technology comprises a baffle 200. The baffle 200 is configured to dissipate fluid energy and/or to divert or redirect fluid.

Figure 3E:
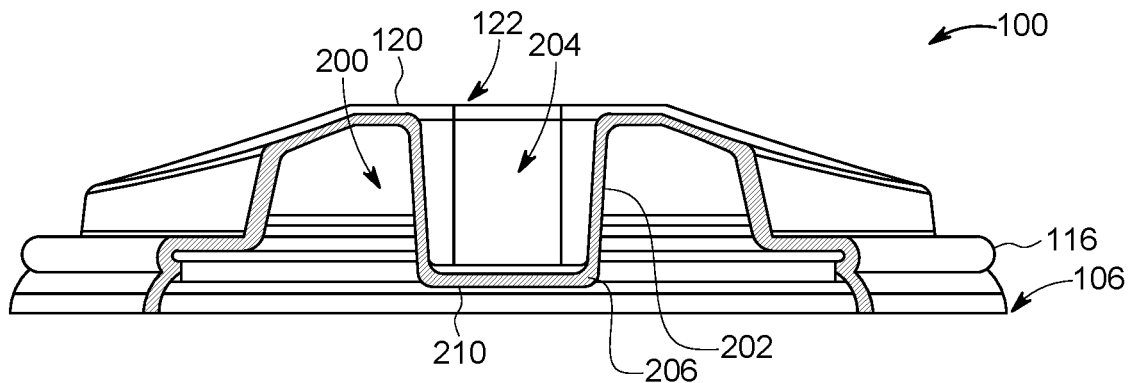
Figure 3F:
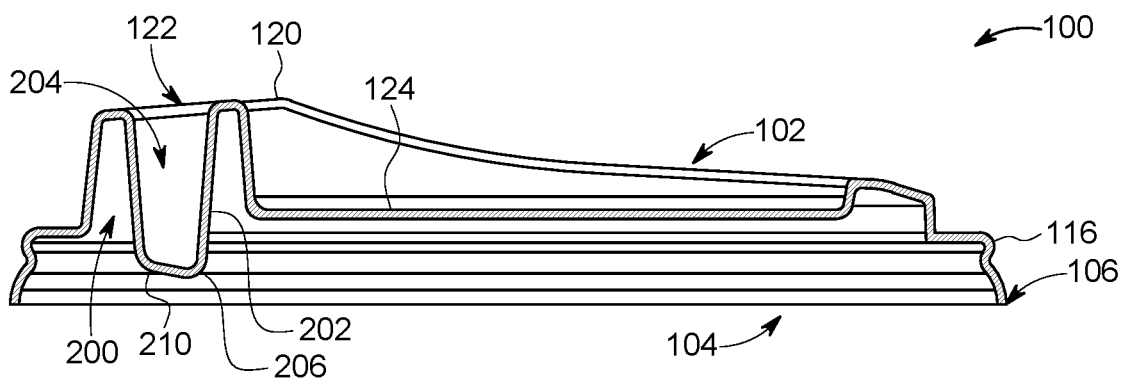

One embodiment of a fluid dissipation and diversion element is illustrated in FIGS. 3E and 3F. In one embodiment, the baffle 200 extends downwardly from the bottom of the lid 100 at, or adjacent to, the drink opening 122. In the illustrated embodiment, the baffle 200 comprise a body or wall 202 that extends downwardly from the lid 100 at the drink opening 122. In one embodiment, the baffle 200 has a first or top end and a second or bottom end 206, and defines a passage 204. In one embodiment, the top end of the baffle 200 is located at the drink opening 122, such that the passage 204 leads to or forms and extension of the drink opening 122, in a downward direction.

When the drink opening 122 is generally oval in shape, the wall 202 may have generally the same peripheral shape and the passage 204 defined thereby may be similar in shape. However, in other embodiments, the baffle 200, including the wall 202 and passage 204, may have shapes which differ from that of the drink opening 122.

In one embodiment, the wall 202 extends downwardly from the bottom 104 of the lid 100 at the drink opening 122 generally parallel thereto. In one embodiment, as described in more detail below, the wall 202 is preferably formed in a molding process with the lid 100, such that the wall 202 comprises the same material as the lid 100 and is contiguous with the body of the lid 100 (for example, by press or compression molding a flat piece of stock (such as plastic) or by injection molding).

In one embodiment (such as where, as illustrated, the baffle 200 is not circular in cross-sectional shape), the baffle 200 may have different sides or wall portions, such as a front and back and a pair of opposing sides. One or more portions of the wall 202 may extend downwardly from the lid 100 different distances than other portions. For example, in the preferred embodiment, a rear portion (closest to the rear 110 of the lid 100) may extend downwardly further than a front portion (closest to the front 108 of the lid).

In one embodiment, the baffle 200 has a bottom or bottom end 206. The bottom end 206 is preferably generally closed. When one or more portions of the wall 202 extend downwardly different distances, the bottom end 206 may be tilted (e.g. not lie in a horizontal plane or a plane which is parallel to the bottom edge of the lid 100). For example, in the preferred embodiment where the rear of the wall 202 extends downwardly further than the front, the bottom end 206 may tilt upwardly moving from the rear 110 of the lid 100 towards the front 108

In one embodiment, one or more openings 210 (which may be referred to as "flow openings") are provided for allowing fluid to pass through the baffle 200 to the drink opening 122. In one embodiment, one or more perforations or apertures are defined in the baffle 200 and allow fluid to flow from the container 20 and through the baffle 200 into the passage 204 and thereon to the drink opening 122.

Figure 7:
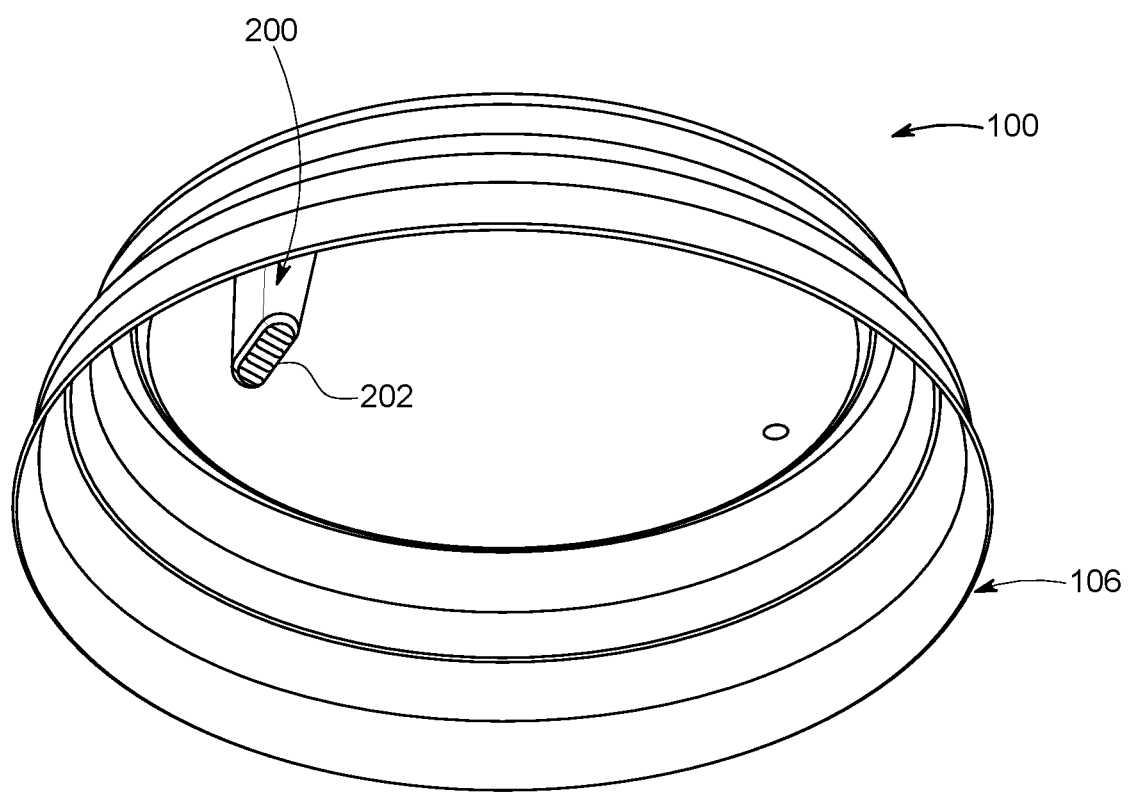

As illustrated in FIGS. 3B, 3E and 3F, the one or more openings 210 are provided in the bottom 206 of the baffle 200. The openings 210 might have various shapes and sizes. In a preferred embodiment, the openings 210 may themselves be elongate or oblong. In one embodiment, the passage 204 is about 16 mm long and 6.88 mm wide. In one embodiment, the openings 210 are about 3.48 mm long and 1.5 mm wide, and four openings 210 are provided, spaced from one another (e.g, being non-contiguous or not connected) by about 1.5 mm. In such a configuration, and as illustrated in FIGS. 3B and 7, the area of each opening 210 may be about 10% and no more than about 25% of the area of the size of the drink opening and passage 204. Of course, the size and shape of the openings 210 may depend upon the size and shape of the baffle 200, including the bottom 206 thereof. In general, however, the openings 210 are preferably relatively small in dimension (in relation to the passage 204 and/or drink opening 122) in order to reduce the flow of fluid therethrough In one embodiment, the length of the baffle 200 (e.g. the distance that it extends downwardly below the drink opening 122) may be at least 14 to 25 mm (total distance). In a preferred embodiment, as illustrated in FIG. 3F the baffle 200 extends downwardly below the bottom of the central section 124 of the lid. In such a configuration, the wall 202 of the baffle 200 extends downwardly to a point where fluid can impact the baffle, so that the baffle 200 is effective in dissipating fluid energy and thus the motion of the fluid in the container. Further, this distance is effective in preventing fluid from unintentionally travelling upwardly through the passage 204—in particular, even fluid with substantial upward energy/momentum will have insufficient energy to overcome gravity and travel through the passage 204 to the drink opening 122.

In one embodiment, as described above, the lid 100 is preferably formed in a molding process, where the baffle 200 is formed as part of the lid 100. In one embodiment, the one or more openings 210 may be formed in the manufacturing process. For example, once the lid is formed in the molding process, the lid 100 may be inverted and the bottom 206 of the baffle 200 may be punched or pierced in order to form the openings 210. In other embodiments, the baffle 200 might be perforated with a laser or the like.

Figure 4:
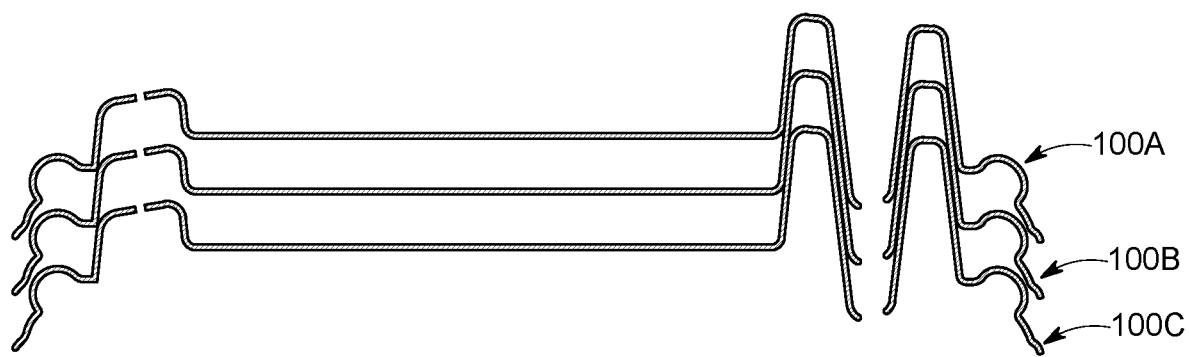
FIG. 4 illustrates a plurality of lids of the present invention in a stacked relationship.

In a preferred embodiment, and as illustrated in FIG. 4 the lid 100 is integrally stackable with other lids, meaning that one lid 100 can be placed on another with mating portions thereof located adjacent to one another (e.g. not merely set upon one another so that a bottom-most portion of one lid engages the top-most portion of another lid). This configuration is advantageous because it reduced the space the lids 100 occupy during transport and storage.

In order to facilitate this stacking arrangement, walls of the raised area 120 and the bottom of the flange 160 have a negative draft (e.g. tapers outwardly, when moving in the direction of the top 102 to the bottom 104 of the lid 100). Most importantly, as illustrated in FIG. 4, the wall 202 of the baffle 200 has a positive draft (e.g. tapers inwardly, when moving in the direction of the top 102 towards the bottom 104 of the lid 100). This allows the downwardly extending baffle 200 of one lid 100 to fit through the drink opening 122 and into the passage 204 of the baffle 200 of a lid beneath it, thereby allowing the lids 200 to be stacked in an inter-engaging arrangement.

Advantages of the Invention

Figure 5:
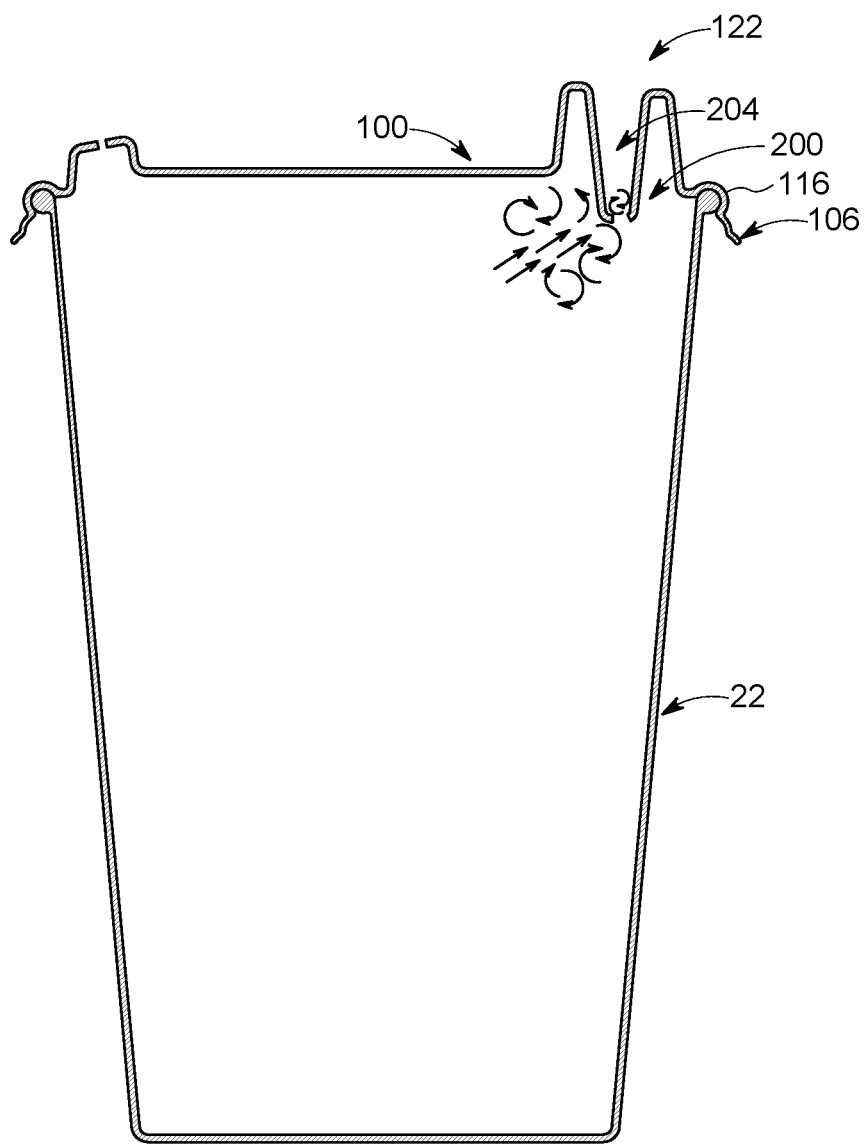
FIG. 5 is a cross-sectional view of a cup with a lid in accordance with the present invention.

The baffle 200 described above and the container 20 having a lid 100 with such a baffle 200, has particular advantages. A first advantage is that the baffle 200 reduces the energy of fluid moving towards the drink opening 122. The baffle 200 also diverts fluid away from the drink opening 122. For example, referring to FIG. 5, fluid that is moving generally laterally in the cup 20 hits the wall 202 of the baffle 200, which impedes the flow of fluid to the drink opening 122. Fluid that is moving towards the bottom 206 of the baffle 200 must flow through the openings 216 in order to enter the passage 204 and flow to the drink opening 122. This requires that the fluid flow through the openings 210. Due to the size and location of the openings 210, the baffle 200 slows (reduces the energy) of fluid flowing into the passage 204, reducing the chance that fluid has sufficient energy to travel upwardly through the baffle 200 and out of the drink opening 122.

The baffle 200 is thus effective in preventing the unwanted dispensing of fluid from the container 20 through the drink opening 122, such as if the container 20 is jostled, bounces or the like (such as when being carried, moved in a car, etc.).

Advantageously, however, a user can freely/intentionally dispense liquid from the container 20. By tipping the container 20, the user can allow fluid to cover the baffle 200 and then flow through the openings 210 into the passage 204 and to the drink opening 122, such as for drinking by the user.

Additional Aspects of the Invention

It will be appreciated that while the baffle 200 which is described above has particular advantages, the one or more baffles may have a variety of shapes (including sizes) and may include baffles having different shapes.

The one or more baffles may be solid or may define one or more openings or apertures, such as perforations, passages, etc. The openings, apertures, passages or other features might have the same size/shape or have different sizes and/or shapes, including based upon the location of the baffle.

The one or more baffles may have smooth surfaces or might comprise rough or modified surfaces, such as surfaces having features designed to interact with fluid to absorb energy from fluid and/or slow the movement of fluid.

The one or more baffles might be movable or have one or more movable portions, such as comprising movable flaps.

As indicated herein, embodiments of the invention may apply to containers of various configurations, including cans, bottles, cups, jugs, carafes, jars, etc. Such containers may be constructed from various materials including paper, plastic, foams, metal, glass, etc.

As indicated, the spill-prevention technology, such as the one or more baffles, might be associated with the top of a container, where the top does not comprise a removable lid. The one or more baffles may be used with lids having different configurations, including shapes, than the lid 100 illustrated in FIG. 3. As one example, the lid might be generally planar on the top or bottom (rather than having a raised area), or might have a central depressed area. The lid might also include one or more air holes. Further, instead of being designed to press fit onto the top rim of a cup, the lid might be configured to screw onto the cup, press fit into the cup or otherwise connect to the cup.

In a preferred embodiment, the one or more baffles which are associated with the container, such as the lid thereof, are designed to divert fluid (such as away from a drink opening), dissipate fluid energy, create redirecting fluid currents, and/or create cancelling fluid waves or currents, such as to divert fluid from or reduced the energy of fluid flow towards, a drink opening of the lid. In this regard, the one or more baffles might comprise or be referred to as barriers, diverters, obstacles, etc.

In one embodiment, the one or more baffles are associated with a container lid and an associated drink opening. In other embodiments, the one or more baffles may be associated with the container lid but be spaced from the one or more drink openings. In other embodiments, the one or more baffles may be associated with other portions of the container, such as main body thereof (such as the cup portion, a lower can portion) or a bottom portion. The one or more baffles may extend upwardly from the container, such as the lid thereof— such as by defining a passage which leads upwardly to a raised drink opening.

Figure 6:
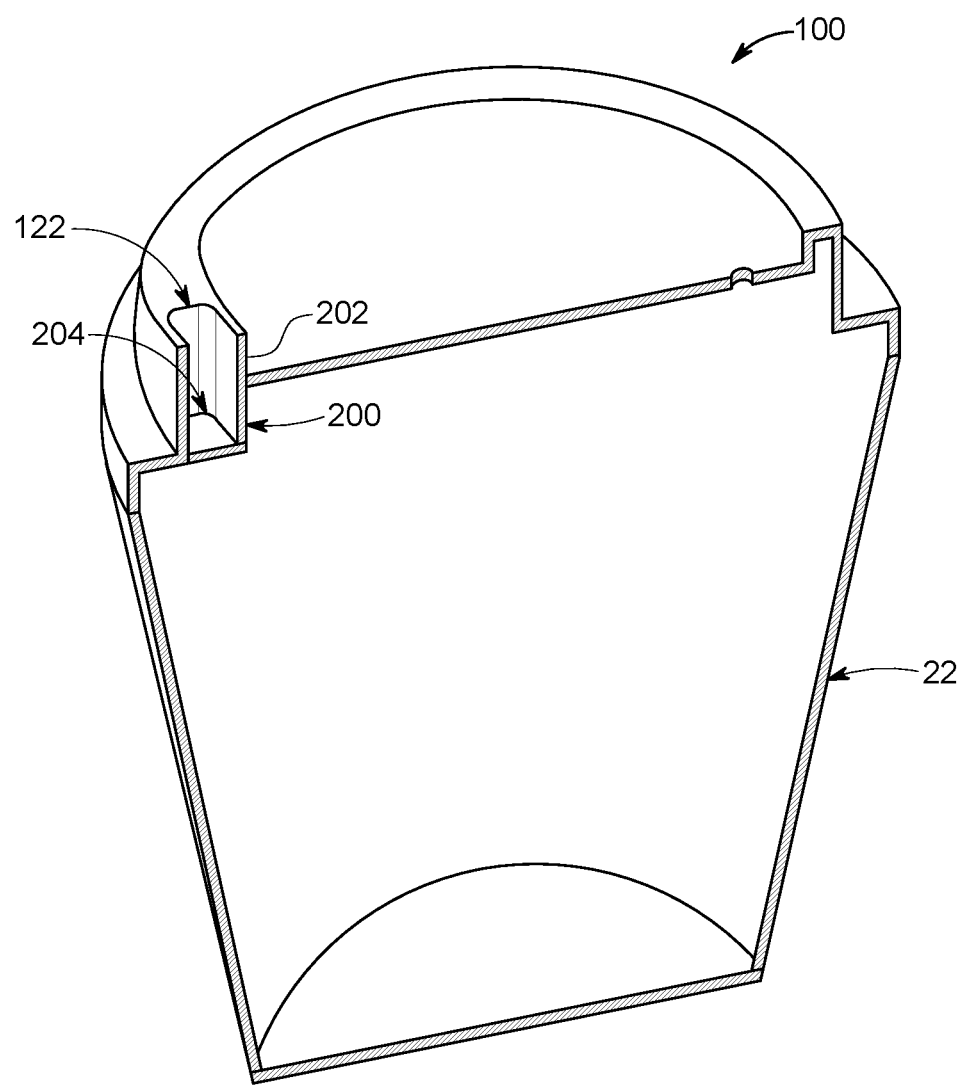
FIGS. 6 and 7 illustrate lids having spill prevention technology in accordance with alternate embodiments of the present invention.

In one embodiment, as illustrated in FIG. 6, the baffle might essentially be integrated into the lid, such as by having the wall portion 202 thereof comprise a portion of the raised area 120 of the lid. Once again, the baffle 200 thus defines a passage 204 that extends from a bottom 206 of the baffle 200 upwardly to the drink opening 122 at the top surface of the lid 100.

In one embodiment, the wall or walls of the baffle 200 may extend downwardly generally perpendicular to the lid and may be generally straight. However, one or more portions of the baffle 200 might extend away from the lid 100 at an angle. Further, one or more portions of the baffle 200, such as one or more portions of the wall 202, might be curved (including arched, parabolic, etc.), such as to increase the surface area of the baffle 200, such as illustrated in FIG. 7.

In one embodiment, the one or more baffles may comprise a diverter, arch, or a wedge shaped element. A diverter may comprise a body that extends downwardly, such as from the bottom of a lid, in order to divert fluid away from an opening. The diverter might comprise, for example, a downwardly extending wall, where the wall may have various shapes. When the drink opening is positioned on the near side of the lid, the diverter might be located on the opposite side of the drink opening. As described above, a baffle may comprise a wedge shaped section or element that comprises a walled element which extends downwardly from the lid or upwardly from the lid at the drink opening, where the wedge shaped section may taper.

In some embodiments, combinations of two or more baffles might be utilized. For example, a baffle comprising a wedge shaped section such as described above might be associated with the drink opening. Another baffle comprising a diverter might be spaced from the wedge shaped section.

The following are other examples of potential variations or features of the invention:

In one embodiment, the bottom surface of the baffle is angled towards an opening.

In one embodiment, the bottom surface of the baffle is arched towards an opening.

In one embodiment, lids are produced upside down.

In one embodiment, lids are manufactured with the baffle on top/extending upwardly, such as to a raised drink opening.

In one embodiment, openings in lids are made from underneath.

In one embodiment, openings in lids are punched from underneath.

In one embodiment, the openings in lids are made from above the lid.

In one embodiment, the openings in lids are punched from above the lid.

In one embodiment, the baffle reduces direct flow to an opening.

In one embodiment, the baffle impedes the flow of contents to an opening.

In one embodiment, one or more baffles are used to reduce flow to an opening.

In one embodiment, one or more baffles impede the flow of contents to an opening.

In one embodiment, the baffle extends just below the top of the lid.

In one embodiment, the baffle extends down between the top of the lid to the bottom edge of the lid.

In one embodiment, the baffle extends down below the bottom edge or flange of the lid.

In one embodiment, there are flow openings on the front surface or wall of the baffle.

In one embodiment, there are flow openings on the bottom of the baffle.

In one embodiment, there are flow openings on a left side or wall portion of the baffle.

In one embodiment, there are flow openings on the right side or wall portion of the baffle.

In one embodiment, there are flow openings on a front and/or rear of the baffle.

In one embodiment, there are flow openings on two or more surfaces on the baffle.

In one embodiment, the flow openings in the baffle are positioned away from an opening.

In one embodiment, the flow openings in the baffle are random across one or more surfaces thereof.

In one embodiment, the flow openings in the baffle are a combination of one or more of the arrangements described herein.

In one embodiment, the drink opening is arched away from the nearest or front edge of the container.

In one embodiment, a horizontal shape of the baffle is congruent with the horizontal shape of the drink opening in the lid or cover.

In one embodiment, a horizontal shape of the baffle is congruent with the horizontal outline of the uppermost opening in the lid or cover.

In one embodiment, the shape of the drink opening in the lid is the same shape as the baffle below.

In one embodiment, the shape of the drink opening in the lid is congruent with the shape of the baffle.

In one embodiment, one or more baffles are used to redirect the contents of a container.

In one embodiment, one or more baffles are used to create counter currents inside a container.

In one embodiment, one or more baffles are used to change momentum of fluid inside a container.

In one embodiment, one or more partial baffles are used to redirect the contents of a container.

In one embodiment, one or more partial baffles are used to reduce the direct flow of liquid in a container towards an opening.

In one embodiment, one or more partial baffles are used to create counter currents inside a container.

In one embodiment, one or more partial baffles are used to change momentum inside a container.

In one embodiment, one or more baffles are used to create vortices inside a container.

In one embodiment, one or more partial baffles are used to create vortices inside a container.

In one embodiment, the opening (such as a drink opening) of a container is sealed except for such an opening surrounded by several small openings (such as flow openings).

In one embodiment, the smaller flow openings are close enough to allow cohesion of liquids leaving the container.

In one embodiment, the smaller flow openings are large enough to allow air to pass into the container when it is emptied.

In one embodiment, one or more baffles, such as wedge shaped sections, are used to redirect momentum inside a container.

In one embodiment, one or more baffles, such as wedge shaped sections, are used to redirect energy inside a container.

In one embodiment, the one or more baffles are attached to the under the surface of a container (such as a lid thereof), away from a drink opening angled generally toward the closest edge of container (such as a lid thereof).

In one embodiment, the one or more baffles extend almost to an edge of a container (such as a lid thereof) such that contents are forced to pass around the baffle(s) before exiting through a drink opening.

In one embodiment, the one or more baffles extend all the way to the edge of a container (such as a lid thereof).

In one embodiment, the one or more baffles are not perforated.

In one embodiment, the one or more baffles are perforated with one or more flow openings.

In one embodiment, the perforated or flow openings in the baffle(s) are the same size.

In one embodiment, the perforated or flow openings in the baffle(s) vary in size.

In one embodiment, larger perforated or flow openings in the baffle(s) are generally positioned farther away from the drink opening.

In one embodiment, the perforated or flow openings in the one or more baffles are the same shape.

In one embodiment, the perforated or flow openings in the one or more baffles are the same shape.

In one embodiment, the perforated or flow openings in the one or more baffles are different shapes.

In one embodiment, the flow openings in the one or more baffles have flaps.

In one embodiment, the lid includes a baffle comprising a wedge shaped section that is attached to or located at the drink opening and extends downward into the container.

In one embodiment, the lid includes a baffle comprising a wedge shaped section that is attached to the drink opening and extends upward out of the container, above the lid.

In one embodiment, the wedge shaped section is not perforated/does not include flow openings.

In one embodiment, the wedge shaped section is perforated with many flow openings that are generally smaller than the drink opening.

In one embodiment, the wedge shaped section is perforated with one or more flow openings.

In one embodiment, the perforated or flow openings in the wedge shaped section are the same size.

In one embodiment, the perforated or flow openings in the wedge shaped section vary in size.

In one embodiment, the one or more baffles, such as the wedge shaped section, may be detached from the lid.

In one embodiment, the flow openings in the wedge shaped section have flaps.

In one embodiment, the wedge shaped section may be detached from the lid.

In one embodiment, the wedge shaped section may be re-attached to the lid.

In one embodiment, a baffle or portion thereof a drink opening may be a partial or complete sphere, tetrahedron, hexahedron, octahedron, dodecahedron, icosahedron, random shape, or other general barrier that obstructs flow, and may consist of perforated concentric shapes.

In one embodiment, the baffle or portion thereof below a drink opening may be partial or complete sphere, tetrahedron, hexahedron, octahedron, dodecahedron, icosahedron, random shape, or other general barrier that obstructs flow, and may consist of perforated concentric shapes.

In one embodiment, one or more baffles may also be applied to a container or lid air hole.

In one embodiment, the one or more baffles are is made of a different material than the container and/or lid.

In one embodiment, the one or more baffles are made of the same material as the container and/or lid.

In one embodiment, the wedge shaped section is made of a different material than the container and/or lid.

In one embodiment, openings or perforations in the one or more baffles, such as wedge shaped section, are made by heat, energy, electricity, lasers, drills, three dimensional printing, punches or similar processes.

In one embodiment, perforations in the one more baffles, such as a diverter, are made by heat, energy, electricity, lasers, drills, three-dimensional printing, punches or similar processes.

In one embodiment, one or more portions of the one or more baffles, such as a wedge shaped section, are supported to maintain structural integrity during manufacturing.

In one embodiment, one or more portions of the one or more baffles, such as sides of a diverter, are supported to maintain structural integrity during manufacturing.

In one embodiment, the wedge shaped section consists of parabolic shaped cups oriented with the bottom of the cup generally pointed upwards, wherein the cups may be perforated or not perforated.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A spill-preventing, nestable lid for a container comprising:
   a lid body having a top, a bottom and a peripheral flange;
   a drink opening in said lid body; and
   a spill-preventing baffle, said baffle comprising a closed wall extending downwardly from said bottom of said lid body, said baffle having an open top and a bottom, said open top of said baffle communicating with said drink opening, at least one perforation in said bottom, and an unobstructed passage leading through said baffle from said bottom to said open top, allowing liquid to flow from said container into said baffle, through said passage defined by said baffle and to said drink opening during drinking, each perforation in said bottom being substantially smaller in dimension than the dimension of said drink opening, whereby liquid which is splashing is deflected by said wall and bottom of said baffle and whereby said at least one perforations reduces the energy of liquid passing therethrough, whereby said baffle inhibits said splashing liquid from flowing into said passage to said drink opening;
   wherein said closed wall of said baffle tapers inwardly moving from said top to said bottom thereof, thereby permitting mating portions of said lid to be nested onto mating portions of a second lid in order to minimize a volume of space occupied by said lid and said second lid, and wherein, when said lid is nested onto said second lid, said baffle of said lid and a baffle of said second lid fit into one another, and said lid body of said lid and a lid body of said second lid are positioned proximate to one another, thereby reducing a height of said lid and said second lid when nested.

2. The spill-preventing lid in accordance with claim 1, wherein said drink opening is located in a raised portion of said lid body.

3. The spill-preventing lid in accordance with claim 1, wherein said baffle is formed integrally with said lid body.

4. The spill-preventing lid in accordance with claim 1, wherein said bottom of said baffle is tilted.

5. The spill-preventing lid in accordance with claim 1, wherein said wall has a front, a rear, a first side and a generally opposing second side.

6. The spill-preventing lid in accordance with claim 5, wherein said rear of said wall extends downwardly farther than said front of said wall.

7. The spill-preventing lid in accordance with claim 1, wherein each perforation is formed by punching said closed bottom of said baffle.

8. The spill-preventing lid in accordance with claim 1, wherein said peripheral flange is configured to engage a rim of a cup.

9. The spill-preventing lid in accordance with claim 1, wherein said passage has a cross-sectional shape which is generally the same as a cross-sectional shape of said drink opening.

10. The spill-preventing lid in accordance with claim 1, wherein said container comprises a can and said peripheral flange is configured to engage a wall of said can at a top of said can.

11. The spill-preventing lid in accordance with claim 1, wherein an opening area of each of said perforations is less than about 25% of an opening area of said drink opening.

12. The spill-preventing lid in accordance with claim 1, wherein said perforations are laser formed.

13. The spill-preventing lid in accordance with claim 1, wherein said at least one perforation comprises at least 4 non-contiguous perforations.

14. The spill-preventing lid in accordance with claim 13, wherein said non-contiguous perforations comprise a plurality of spaced-part elongate perforations which extend parallel to one another.

15. A spill-preventing lid for a container comprising:
   a lid body having a top, a bottom and a peripheral flange;
   a drink opening in said lid body; and
   a spill-preventing baffle, said baffle comprising a closed wall extending downwardly from said bottom of said lid body, said baffle having an open top, a solid bottom, a height from said open top to said solid bottom, and a width which is generally perpendicular to said height, said height being greater than a maximum dimension of said width, said open top of said baffle communicating with said drink opening, at least one aperture extending through said solid bottom, and a passage leading through said baffle from said bottom to said open top, allowing liquid to flow from said container into said baffle, though said passage defined by said baffle and to said drink opening, each of said apertures through said bottom being substantially smaller in dimension than the dimension of said drink opening, whereby liquid which is splashing is deflected by said baffle and said apertures reduce the energy of liquid passing therethrough, whereby said height of said baffle in relation to said greatest width-wise dimension of said baffle inhibits said splashing liquid from flowing into said passage to said drink opening without the need for a cap or a lid over said drink opening.

16. The spill-preventing lid in accordance with claim 15, comprising a plurality of apertures, wherein an opening area of each of said plurality of apertures is less than about 25% an opening area of said drink opening.

17. The spill-preventing lid in accordance with claim 15, wherein said plurality of apertures comprise a plurality of spaced-part elongate openings which extend parallel to one another.

18. The spill-preventing lid in accordance with claim 1, wherein said baffle has a height from said open top to said bottom, and a width which is generally perpendicular to said height, said height being greater than a maximum dimension of said width so that said baffle inhibits said splashing liquid from flowing into said passage to said drink opening without the need for a cap or a lid over said drink opening.

19. The spill-preventing lid in accordance with claim 15, wherein said closed wall of said baffle tapers inwardly moving from said top to said bottom thereof, thereby permitting mating portions of said lid to be nested onto mating portions of a second lid in order to minimize a volume of space occupied by said lid and said second lid, and wherein, when said lid is nested onto said second lid, said baffle of said lid and a baffle of said second lid fit into one another, and said lid body of said lid and a lid body of said second lid are positioned proximate to one another, thereby reducing a height of said lid and said second lid when nested.

20. A spill-preventing, nestable lid for a container comprising:
   a lid body having a top, a bottom and a peripheral flange;
   a drink opening in said lid body; and
   a spill-preventing baffle, said baffle comprising a closed wall extending downwardly from said bottom of said lid body, said baffle having an open top and a bottom, said open top of said baffle communicating with said drink opening, a plurality of elongate non-contiguous perforations in said bottom, and a passage leading through said baffle from said bottom to said open top, allowing liquid to flow from said container into said baffle, through said passage defined by said baffle and to said drink opening during drinking, each of said perforations in said bottom being substantially smaller in dimension than the dimension of said drink opening, wherein an opening area of each of said plurality of perforations is less than about 25% an opening area of said drink opening and wherein said baffle has a height from said open top to said bottom, and a width which is generally perpendicular to said height, said height being greater than a maximum dimension of said width, whereby liquid which is splashing is deflected by said wall and bottom of said baffle and whereby said perforations reduce the energy of liquid passing therethrough, whereby said baffle inhibits said splashing liquid from flowing into said passage to said drink opening without the need for a cap or a lid over said drink opening;

and wherein said closed wall of said baffle tapers inwardly moving from said top to said bottom thereof, thereby permitting mating portions of said lid to be nested onto mating portions of a second lid in order to minimize a volume of space occupied by said lid and said second lid, and wherein, when said lid is nested onto said second lid, said baffle of said lid and a baffle of said second lid fit into one another, and said lid body of said lid and a lid body of said second lid are positioned proximate to one another, thereby reducing a height of said lid and said second lid when nested.

* * * * *